United States Patent
Krishnaiah et al.

(10) Patent No.: US 12,147,973 B2
(45) Date of Patent: Nov. 19, 2024

(54) SYSTEMS AND METHODS FOR IMPLEMENTING HYBRID DYNAMIC WALLET TOKENS

(71) Applicant: PayPal, Inc., San Jose, CA (US)

(72) Inventors: Akshay Sanjeevaiah Krishnaiah, San Jose, CA (US); Nitin Prabhu, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 491 days.

(21) Appl. No.: 16/119,947

(22) Filed: Aug. 31, 2018

(65) Prior Publication Data

US 2018/0374083 A1    Dec. 27, 2018

Related U.S. Application Data

(63) Continuation of application No. 14/666,025, filed on Mar. 23, 2015.

(60) Provisional application No. 62/046,873, filed on Sep. 5, 2014.

(51) Int. Cl.
G06Q 20/36    (2012.01)
G06Q 20/40    (2012.01)

(52) U.S. Cl.
CPC ....... *G06Q 20/363* (2013.01); *G06Q 20/3672* (2013.01); *G06Q 20/401* (2013.01)

(58) Field of Classification Search
CPC ............. G06Q 20/401; G06Q 20/3672; G06Q 20/326; G06Q 20/363
See application file for complete search history.

(56) References Cited

U.S. PATENT DOCUMENTS

| 6,039,245 | A | 3/2000 | Symonds et al. |
| 8,543,810 | B1 * | 9/2013 | Angal ............... H04L 63/205 705/50 |
| 9,773,212 | B2 * | 9/2017 | Hammad ............ G06Q 10/00 |
| 2002/0152158 | A1 * | 10/2002 | Paleiov ............. G06Q 20/12 705/39 |

(Continued)

FOREIGN PATENT DOCUMENTS

CA    2771395 A1 *    5/2013    ............. H04L 12/14

OTHER PUBLICATIONS

Berson—Apr. 12, 2013—The benefits of metadata and implementing a metadata management strategy (Year: 2013).*

(Continued)

*Primary Examiner* — Ilse I Immanuel
(74) *Attorney, Agent, or Firm* — Haynes and Boone, LLP

(57) ABSTRACT

A system or method may be provided to implement dynamic hybrid wallet tokens. The method can includes determining to generate a hybrid wallet token based on a user request for a transaction at a user device. The method includes determining, based on a transaction type of the transaction, non-payment information of a user associated with the user device. The method includes generating a hybrid wallet token for use with a payment account associated with the user, where the generating is based on the authorization token and on the transaction type, the hybrid wallet token comprising information indicating a funding instrument associated with the user, the hybrid wallet token further comprising the non-payment information. The method also includes providing the wallet token to the user device for implementing the transaction.

17 Claims, 9 Drawing Sheets

(56) References Cited

U.S. PATENT DOCUMENTS

| | | | |
|---|---|---|---|
| 2003/0065594 A1* | 4/2003 | Murphy | G06Q 30/0601 705/35 |
| 2003/0236747 A1* | 12/2003 | Sager | G06Q 20/102 705/40 |
| 2007/0125838 A1 | 6/2007 | Law et al. | |
| 2007/0162337 A1 | 7/2007 | Hawkins et al. | |
| 2008/0103923 A1 | 5/2008 | Rieck et al. | |
| 2009/0198617 A1* | 8/2009 | Soghoian | G06Q 20/04 705/65 |
| 2010/0325048 A1* | 12/2010 | Carlson | G06Q 20/26 705/44 |
| 2011/0010289 A1* | 1/2011 | Kranzley | G06Q 20/10 705/39 |
| 2012/0296817 A1* | 11/2012 | Powell | G06Q 30/02 705/40 |
| 2012/0303425 A1 | 11/2012 | Katzin et al. | |
| 2013/0085835 A1* | 4/2013 | Horowitz | G06Q 30/0207 705/14.38 |
| 2013/0238503 A1 | 9/2013 | Patel | |
| 2014/0040139 A1 | 2/2014 | Brudnicki et al. | |
| 2014/0074568 A1 | 3/2014 | Moscoe et al. | |
| 2014/0149285 A1 | 5/2014 | De et al. | |
| 2014/0164119 A1 | 6/2014 | Narayanan et al. | |
| 2014/0279556 A1* | 9/2014 | Priebatsch | G06Q 20/322 705/67 |
| 2015/0112870 A1* | 4/2015 | Nagasundaram | G06Q 20/3821 705/67 |
| 2015/0127547 A1 | 5/2015 | Powell et al. | |
| 2015/0199679 A1* | 7/2015 | Palanisamy | G06Q 20/385 705/67 |
| 2015/0363781 A1* | 12/2015 | Badenhorst | G06Q 20/385 705/44 |
| 2016/0140546 A1 | 5/2016 | Taratine et al. | |
| 2016/0224967 A1 | 8/2016 | Davis et al. | |
| 2016/0300226 A1 | 10/2016 | Novac et al. | |
| 2016/0371680 A1 | 12/2016 | Miles | |
| 2019/0339823 A1* | 11/2019 | Shaffer | H04L 51/32 |

OTHER PUBLICATIONS

Berson Techtarget.com, The benefits of metadata and implementing a metadata management strategy (Year: 2013).*

Berson—The benefits of metadata and implementing a metadata management strategy, https://web.archive.org/web/20130412052058/https://searchitchannel.techtarget.com/feature/The-benefits-of-metadata-and-implementing-a-metadata-management-strategy (Year: 2013).*

Pradipta; Towards an interoperable mobile wallet service; 2013 10th International Conference and Expo on Emerging Technologies for a Smarter World (CEWIT), 2013, p. 1-6.*

"EMV®Payment Tokenisation Specification-Technical Framework," EMVCo, LLC, Mar. 2014, 84 Pages, Version 1.0.

"HCE cashless 3.0 Activate NFC mobile-based payments on contactless acceptance devices." TAS Group, [retrieved on Aug. 15, 2017], 2 Pages [online]. Retrieved from the Internet: <https://www.google.com/url?sa=t&rct=j&q=&esrc=s&source=web&cd=1&ved=0ahUKEwiOwP3BiLjaAhWI-IQKHf1HDUkQFggpMAA&url=https%3A%2F%2Fwww.tasgroup.eu%2Fsolutions%2Fcashless-world%2Fe-m-commerce%2Fcl-hce&usg=AOvVaw05FdiG5KXh2irdPZ94ovAU>.

"Payment Token Format Reference," Apple Inc., Apr. 14, 2017 [retrieved on Aug. 15, 2017], 7 Pages [online]. Retrieved from the Internet: <https://developer.apple.com/library/content/documentation/PassKit/Reference/PaymentTokenJSON/PaymentTokenJSON.html>.

"RSA SecurID® Token Record Decryption Guide," Part No. 62690A0, EMC Corporation, Dec. 2013, pp. 1-12.

"U.S. Real-Time Payments Business Playbook," The Clearing House Payments Company L.L.C., Mar. 2016, 45 Pages [online], Version 1.01. Retrieved from the Internet: <http://www.wespay.org/wpa/docs/TCH_RTP-Business_Playbook_version_103_03_2016.pdf>.

"What Is Tokenization," TokenEx, [retrieved on Aug. 15, 2017], 6 Pages [online]. Retrieved from the Internet: <https://tokenex.com/resource-center/what-is-tokenization/>.

* cited by examiner

FIG. 8

SYSTEMS AND METHODS FOR IMPLEMENTING HYBRID DYNAMIC WALLET TOKENS

CROSS REFERENCE TO RELATED APPLICATION

This application is a continuation of U.S. patent application Ser. No. 14/666,025, filed Mar. 23, 2015, which claims benefit of priority to U.S. Provisional Patent Application Ser. No. 62/046,873, filed Sep. 5, 2014, both of which are incorporated by reference in their entirety.

BACKGROUND

Field of the Invention

The present invention generally relates to systems and methods for implementing hybrid dynamic wallet tokens.

Related Art

With the popularity of cross channel commerce (omnichannel), many payments are made across channels (online, offline, mobile etc). As the payment industry looks to a more secured method of transactions, there is a dire need to prevent any type of card/funding source data from being shared across payment systems. Also, there is a need to securely represent the digital identity of a user that is needed for a transaction to enable the Internet of things (IoT) use cases.

BRIEF DESCRIPTION OF THE FIGURES

FIG. 8 illustrates data fields of card payment transactions according to one embodiment.

Figure 1:
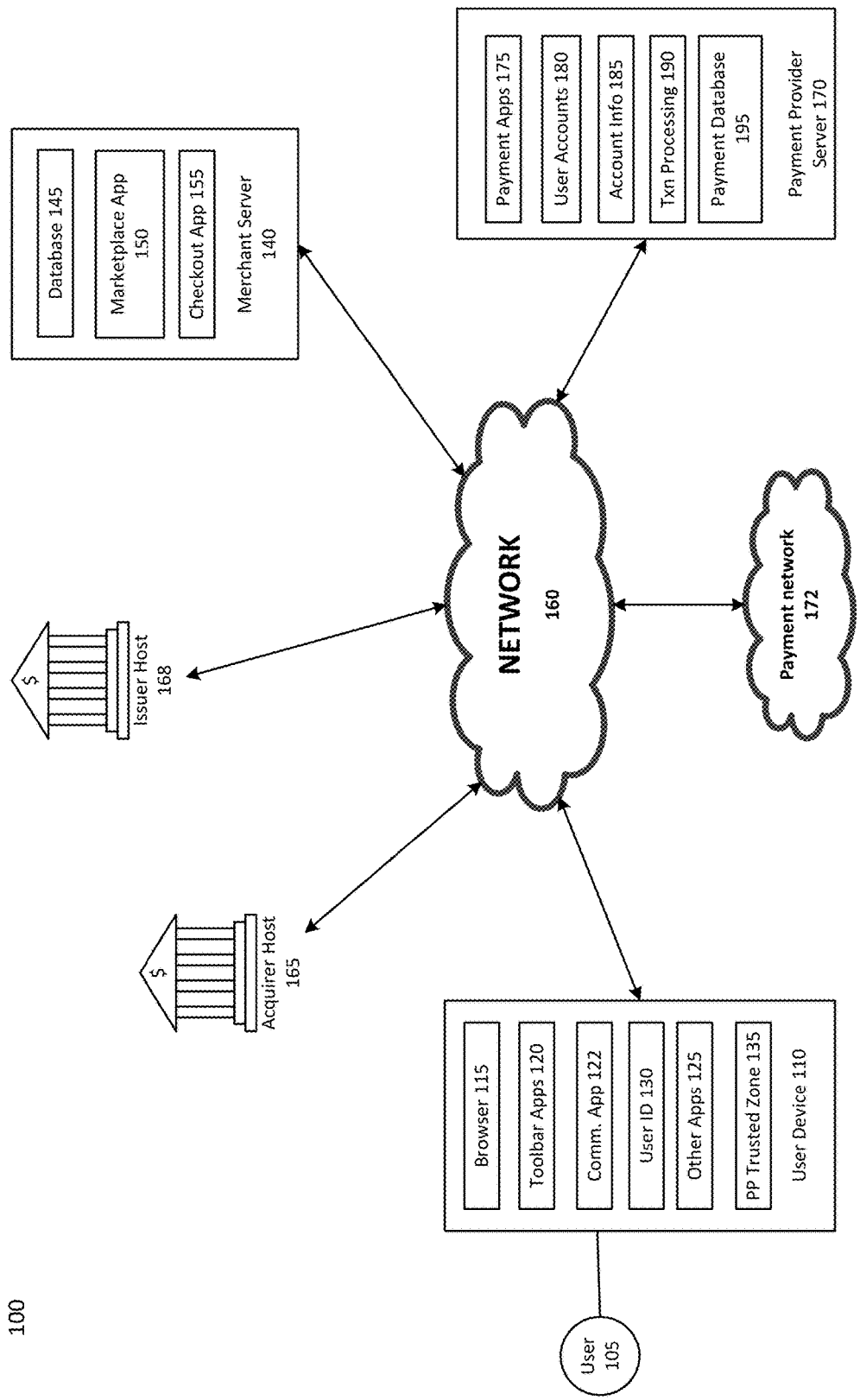
FIG. 1 is block diagram of a networked system suitable for implementing hybrid dynamic wallet tokens according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method may be provided to implement dynamic hybrid wallet tokens. In particular, dynamic hybrid wallet tokens may be used to access metadata. Further, encrypted tokens may be cached to enable transaction during periods of no or limited connectivity. A new payment network architecture may be established to allow a payment service provider, such as PayPal Inc., to implement a seamless flow of enriched payment transactions that includes transactions of non-payment related information. The payment network architecture not only can carry payment information, but also other information of users, such as driver license information, insurance card information, loyalty program information, earn-and-burn accounts, pre-paid cards, PLCC and other digital metadata about the user including but not limited to health care information.

In an embodiment, hybrid dynamic wallet tokens may be morphed with additional information based on the types of transactions to be performed and may be communicated over industry payment networks. This can be done using discretionary fields in the track 1 and 2 data sent to a terminal In addition more information can be relayed between parties using ISO 8583 Bitmap 2 or 3 (or any other transaction format with relevant data fields available) that will contain maps to additional transaction related data elements such as risk rating, fraud score, loyalty, user verification, payments/transaction profile of the customer etc. In another embodiment, a wallet token service provider, such as PayPal, Inc., may be provided and/or configured to issue the hybrid dynamic wallet tokens that are channel specific or channel agnostic providing a multitude of payment and non-payment information via one single token. In still another embodiment, a system or method may be provided to implement offline caching of encrypted wallet tokens in a mobile application. In particular, the wallet token service provider may use Industry Standard IIN range numbers as tokens to transmit information in lieu of actual funding instrument along with value added information to all interacting parties allowing each party to de-tokenize via secure connection from the backend to identify the true funding instrument only when needed and relay additional information that can be leveraged for value added payment/non-payment services.

The hybrid dynamic wallet token is different from other tokens, such as conventional payment tokens, as it may represent additional value added payment/business/consumer information other than payment information linked to a particular issuer or payment network.

For example, the hybrid dynamic wallet token may include identity information of a consumer which may be translated into metadata that may be used for value added service interactions in the Internet of Things (IoT). In an embodiment, digital information related to a user's identity, such as health care records, insurance information, government transactions, Internet of Things (IoT), and the like, may be included as underlying metadata with the hybrid dynamic wallet tokens and communicated over the payment network. In particular, the types of information included with the hybrid dynamic wallet tokens may depend on the type of transactions being processed. For example, if the transaction is related to a payment for an alcoholic beverage, the information included with the wallet token may include payment information, age information, and other information relevant to the purchase of the alcoholic beverage. As such, the user may utilize the hybrid dynamic wallet token to make the purchase, without having to present other identification, such as a driver's license. In an embodiment, the information included with the wallet token may include user's preferences, user's loyalty accounts, user's routines, and/or other user related information. As such, transactions may be processed based on this information included with the wallet token. For example, a payment at a restaurant may include a user's preference for percentage of tip. As such, a preferred percentage for a tip may automatically be added to the payment based on the user's preference information included with the wallet token. As such, the user may pay with the wallet token without have to figure out the amount of tip for the bill.

Figure 8:
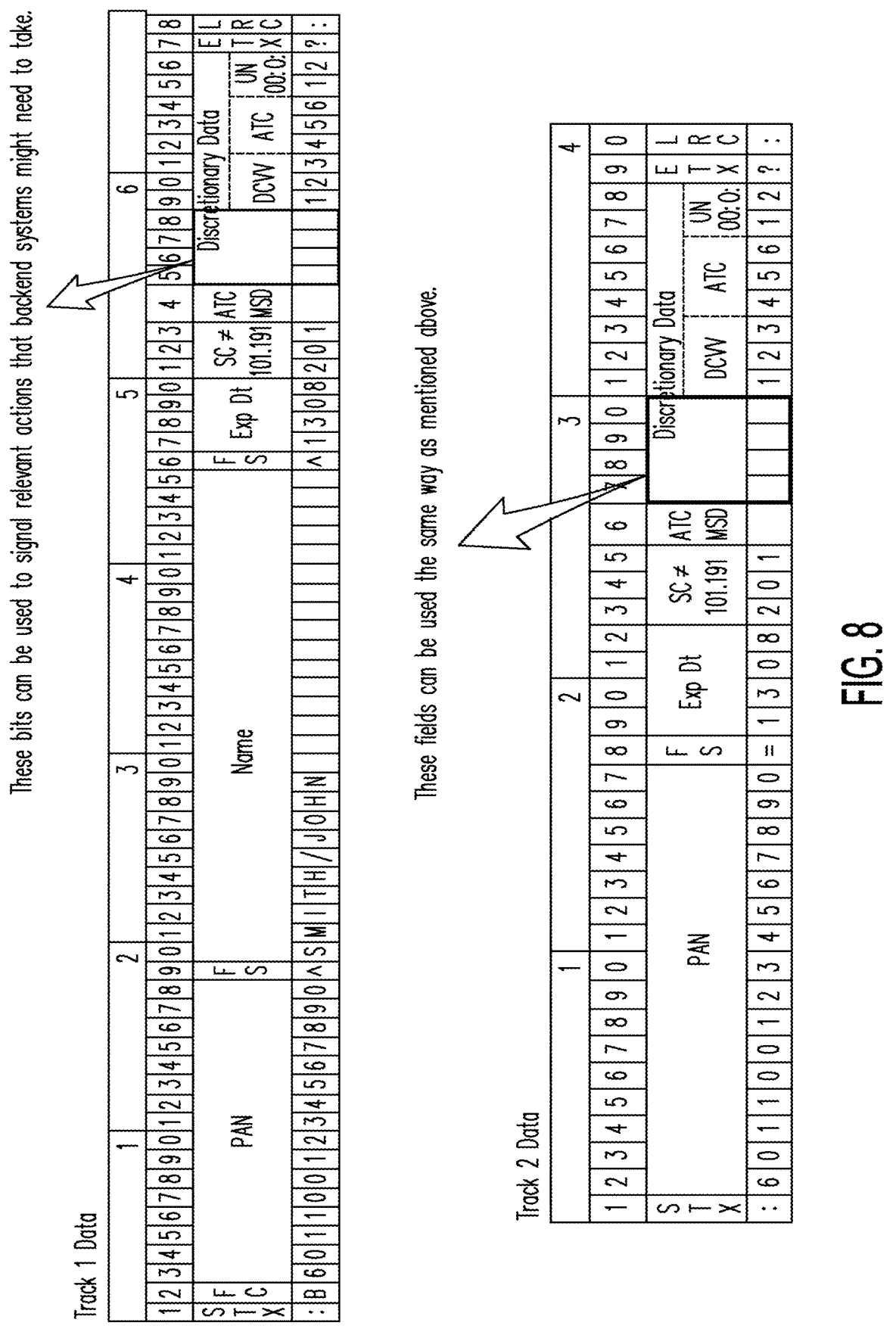

Referring to FIG. 8, table diagrams of track 1 and track 2 are illustrated. There are up to three tracks on magnetic cards known as tracks 1, 2, and 3. Point-of-sale card readers may read track 1, or track 2, and sometimes both, in case one track is unreadable. The minimum cardholder account information needed to complete a transaction is present on both tracks. Track 1 has a higher bit density (210 bits per inch vs. 75), is the only track that may contain alphabetic text, and hence is the only track that contains the cardholder's name. Track 1 is written with code known as DEC SIXBIT plus odd parity. The information on track 1 on financial cards is contained in several formats: A, which is reserved for proprietary use of the card issuer, B, which is described below, C-M, which are reserved for use by ANSI Subcommittee X3B10, and N-Z, which are available for use by individual card issuers. Additional information based on the types of transactions to be performed may be coded and inserted into the discretionary data fields in track 1.

Track 2 format was developed by the banking industry (ABA). This track is written with a 5-bit scheme (4 data bits+1 parity), which allows for sixteen possible characters, which are the numbers 0-9, plus the six characters : ; < = > ?. The sixteen codes map to the ASCII range 0x30 through 0x3f, which defines ten digit characters plus those six symbols. Similarly, the discretionary data fields may carry additional information about the transaction, the merchant, and/or the user.

ISO8583 transaction messages and/or any other relevant data transmission protocol also may be used to relay additional information to various parties of card transactions. ISO 8583 messages and/or any other relevant data transmission protocol may include a 4-digit message type indicator indicating version of message, message class, message function, and message origin. ISO 8583 messages also may include a bitmap that indicates or maps the position and presence of data within the message. Various data elements are designated to carry particular types of information. Certain data elements may be available to carry additional information about the transaction, the merchant, and/or the user. The bitmap may point out these data elements that carry additional information. Thus, ISO 8583 transaction messages and/or any other relevant data transmission protocol also may be used to carry additional information.

Discretionary fields may be used in scenarios where deep integration is lacking, e.g., deep integration on the Point of Sale system (POS) or other intermediary systems and are at liberty to only send the track 1 and track 2 data via industry standard rails. In this case, the discretionary fields may be set up in such a way that they map to relevant actions on the paypal server that can be taken when we receive it from intermediary systems such as payment networks thru a direct integration or API calls.

ISO8583 Bitmap 2 and 3 (and/or any other relevant data transmission protocol) may be used independently/in conjunction with discretionary fields in track 1 and 2 to send merchant specific requests or in cases where the payment service provider has deep integration with the POS. Payment provider specific additional information may be sent by mapping them to Bitmap 2 and 3 fields. Additionally with a non-magnetic stripe reader form factor (which is the case with SO/IEC 14443 form factors such as RFID/NFC), track 3 data may also be used to pass user specific information to trigger value added services.

The additional information included in the discretionary fields may be encoded and may be decoded using a lookup table. For example, the code "h," may indicate health related information. When included in the payment token, health-related information of the user may be forwarded to the merchant or other related parties to provide additional information to the related parties. Other codes, such as age, loyalty program, and various personal information related to the user may be coded and communicated in similar ways.

A wallet token provider, such as PayPal, Inc., may implement various aspects of hybrid dynamic wallet tokens. In an embodiment, the identity token provider may generate or create dynamic tokens based on the transaction channel such as online or mobile or in-store or actions performed by the user. For example, the transactions may be financial transactions, such as payments for a purchase, fund transfers, and the like. The transactions may be non-financial transactions, such as checking into a hotel, sharing value added information, such as medical information (allergy), preferences (room preference for hotels), signing up for a membership account, and the like. The dynamic tokens may include identity information of the user that is relevant to the type of transaction being implemented by the user. For example, user's preferences, user's healthcare records, user's age, user's address, user's affiliations, user's loyalty programs, social networking account, and the like may be included with the dynamic token to help facilitate the transactions. In an example, if the transaction is related to user's healthcare, such as checking in at a doctor's office, the dynamic token may include the user's insurance card/ID information that can be used to pre-calculate co-pays and also signal required pre-checks and other actions to the user while notifying medical authorities about a patient's payment and health history to provide relevant services. In another example, if the transaction is related to a user's payment, a user's payment preference, such as preferred funding source, a preferred percentage for tips, and the like, the dynamic wallet token may include these user preferences to customize the transaction. The dynamic tokens may not have monetary value, but may represent an underlying mapping to a metadata source that may be mapped by a wallet token vault.

The wallet token provider, such as PayPal, may implement various processes. In an embodiment, the wallet token provider may authenticate the user based on the dynamic token. The wallet token provider also may generate tokens based on the requirements of the transactions. In another embodiment, the wallet token provider may implement token management, such as register user, add, delete, or manage metadata related to a user's identity or information. Proprietary algorithms may be used for token assurance and/or risk management. The wallet token provider also may mange entities, such as merchants, that need access to the token or token metadata. The wallet token provider may define and implement frameworks for secure operation of the token. In still another embodiment, the wallet token provider may provide token service to users. In particular, the identity token provider may provide service for obtaining new tokens, validation, and metadata access for users or to enable seamless experiences for Internet of Things (IoT). User may be consumers, merchants, businesses, government entities, or any other entities or organizations that require or would benefit from user's information to complete various payment and non-payment service transactions. A secure mechanism may be provided for retrieving tokens, storing tokens in mobile apps and deciphering the stateless tokens in the backend to complete appropriate transactions and services. For example, symmetric encryption techniques may be used to store and/or communicate the tokens over existing secure channels such as SSL to add multiple layers of security.

In an embodiment, the system may use industry standard BINs or IINs and provide dynamic tokens as aliases to funding sources, customer identities and customer metadata together. These dynamic tokens may replace the use of actual funding source information and customer information, such as credit card and other user information that are sent online to a merchant for transaction processing. This may prevent any information from being compromised during transmission across payment networks and/or channels.

The wallet token service provider may provide tokenization services to payment networks, third party vendors, service providers, issuers, merchants, providers of a service and consumers. In an embodiment, the wallet token service provider may provide services for at least four different types of tokens. A static wallet token may be used during the creation of a payment card compatible for use with magnetic strip reader, near-field communication (NFC), or EMV chip. The static wallet token may be hardcoded with the payment card. A dynamic hybrid mobile wallet token may be used by mobile devices (wearable/non-wearable/smart) that are configured to run payment related applications for use in transactions via Near Field Communication (NFC), Bluetooth/Bluetooth Low Energy (BLE), Wifi, wi-di, QR Code and other mobile payment communication mediums. An encrypted dynamic wallet token may be cached for usage via mobile payment solutions when network connectivity is limited or not available. A dynamic hybrid online wallet token may be used for online payment transactions via web or mobile web on desktop browsers, mobile web browsers, tablet browsers, wearable device browsers and other web applications. The use of these tokens may replace the use of actual payment information, identity of the consumer or funding source information for secure transmission. This may reduce the risk of these private information from being compromised both online and offline. All of these tokens will also mask user identity and contain metadata that can be used for multitude of value added services. By using these tokens, the system may provide increased security, improved interoperability among different payment networks, enabling new and upcoming payment channels, and convenience for consumers.

By establishing the wallet token service, a payment service provider, such as PayPal, Inc., may serve as the manager of not only the users' payment transactions, but also other identity information of the users. As such, the users need not request tokens via a third party to obtain a token during transactions. Users of the payment service provider, such as PayPal users, who already process payments through the payment service provider, may now have all their payment information routed across channels via tokens as an alias to their payment information and identity. When this information is routed back to the wallet token service provider, the service provider may further enhance security by sharing the underlying funding instrument information with the payment networks via an industry standard unique third party token called the payment token without disclosing funding information. When the payment network learns of the underlying funding information via de-tokenization service from the industry standard third party token service provider, the payment network may share the same payment token without disclosing or opening the fund information to the issuer during transmission and processing. The wallet token service provider can further mask the user information but provided value added information for value added services, such as loyalty, health care, etc. without compromising the user identity while still providing relevant data. The above features may ensure a closed loop transmission of information to enhance security and integrity.

FIG. 1 is block diagram of a networked system suitable for implementing hybrid dynamic wallet tokens according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, a payment provider server 170, an acquirer host 165, an issuer host 168, and a payment network 172 in communication over a network 160. Payment provider server 170 may be maintained by a payment service provider, such as PayPal, Inc. of San Jose, CA. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc, wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

User device 110 may install and execute a payment application received from the payment service provider to facilitate payment processes. The payment application may allow a user to send payment transaction requests to the payment service provider. In particular, the payment application may authenticate user 105 before making payments. In an embodiment, the payment application may implement automatic authentication of the user 105 when the user 105 is at certain payment locations. The payment application in conjunction with the payment service provider may also provide proxies for user's credentials and funding instrument (e.g., payment and identity proxies for transaction) within secure zone 135 to be used with/without further authentication with payment service provider depending on the transaction or payment situation. The payment application may also receive relevant payment and identity proxies from proximity based ancillary systems such as a Bluetooth beacon installed in the merchant's premises in association with the payment service provider for the purpose of processing transactions or providing value added services to the user.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, user names, phone numbers, credit card information, bank information, or other financial information which may be used to facilitate online transactions by user 105. Account information may also include user purchase history and user ratings. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In one embodiment, payment provider server 170 may include a wallet token vault and an internal wallet token storing various information on token formats, conventions, data, and the like. For example, a wallet token may be generated for a user's payment account to allow payment transactions using the wallet token. A user's identity information, preferences, or other information may be stored and associated with the user's account and mapped to wallet tokens. Merchant accounts at the payment provider server 170 also may store merchant's information, such as type of merchant, product or service offered, method of payments, and the like to ensure diversified use of tokens that may vary by merchant type/service etc.

Payment network 172 may be operated by payment card service providers or card associations, such as DISCOVER, VISA, MASTERCARD, AMERICAN EXPRESS, RuPAY, China Union Pay, etc. The payment card service providers may provide services, standards, rules, and/or policies for issuing various payment cards. A network of communication devices, servers, and the like also may be established to relay payment related information among the different parties of a payment transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at various merchants who agreed to accept the payment card.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Figure 2:
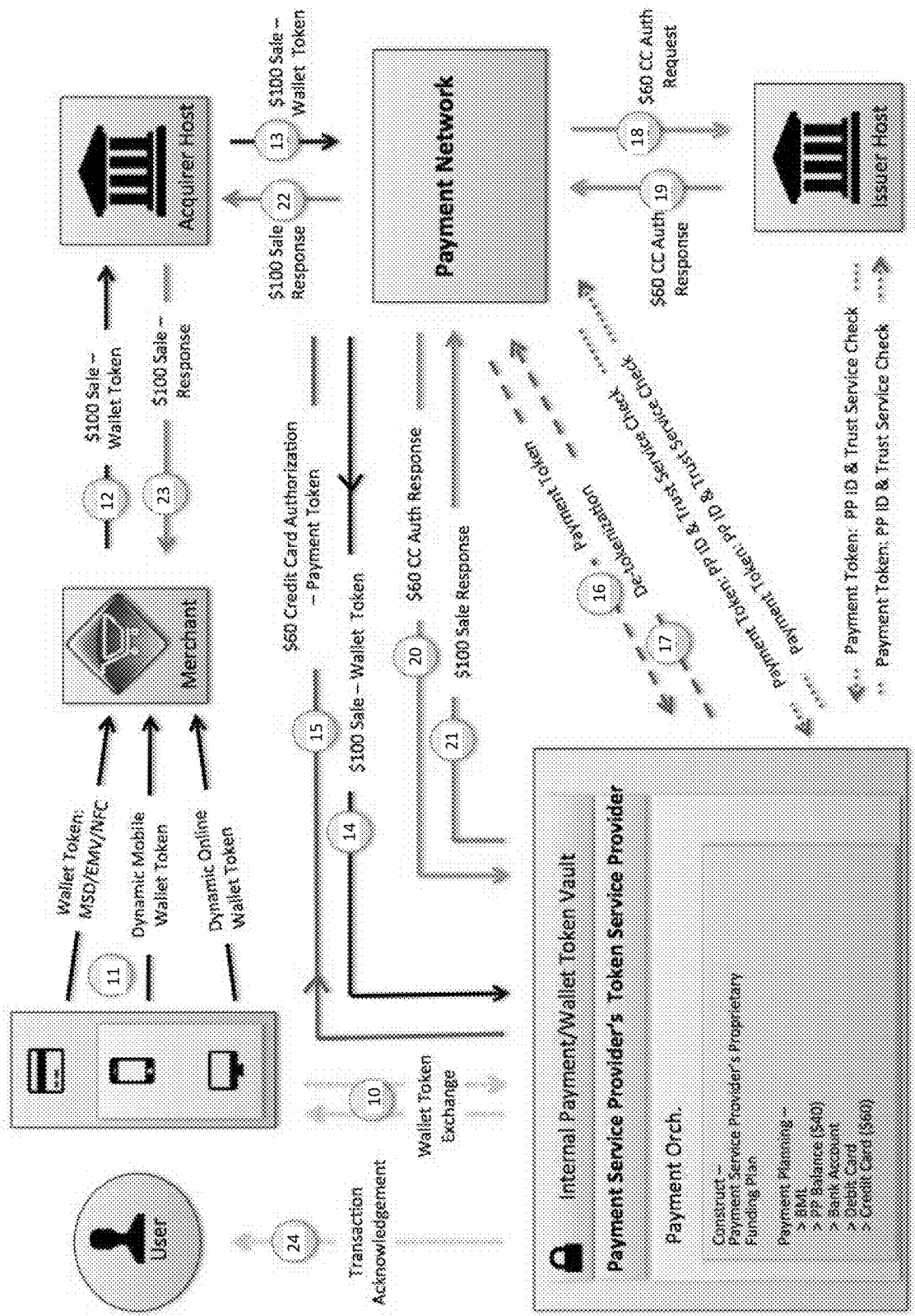
FIG. 2 is a flowchart showing various processes for implementing hybrid dynamic wallet tokens according to one embodiment.

FIG. 2 is a flowchart showing various processes for implementing hybrid dynamic wallet tokens according to one embodiment. Initially, backend processes may be performed at the payment service provider, e.g., PayPal, Inc. In some embodiments, the payment service provider may include the token service provider. In particular, an assurance process is performed to request assurance, such as confirmation of user data and credentials, for funding instrument and users from the issuer, the payment network, or both. The token service provider may receive assurance from the issuer, the payment network, or both. In response to receiving assurance, the token service provider may generate and assign payment tokens to funding sources. In some embodiments, a funding source may be assigned with multiple payment tokens.

At step 10, wallet tokens may be requested from internal wallet token vault of the payment service provider for the user. Based on the type of transaction device, wallet tokens may be requested. For example, a one-time use dynamic wallet token may be requested for use with mobile or online transactions made via a mobile device or a desktop device in real time. Multiple-use tokens may be hardcoded in a payment card. A wallet token may be generated for a payment card configured to implement payment via MSR, EMV, or NFC. A dynamic mobile wallet token may be generated for a mobile device. A dynamic online wallet token may be generated for a desktop device.

The term "wallet token" may refer to a proxy value for a user's payment account, such as a payment provider user account, e.g., a 8 to 19-digit numeric value which passes basic validation rules of an account number along with discretionary data in industry standard track 1 and track 2 formats that may have information pertaining to additional value added services such as identity assurance, loyalty, Internet of Things (IoT), etc. Wallet tokens may be generated within a BIN/IIN range that has been designated as a token BIN/IIN range and flagged accordingly in all appropriate BIN/IIN tables. Wallet tokens may not have the same value as or conflict with a real PAN. There may be at least three types of wallet tokens, namely: a "wallet token," a "dynamic mobile wallet token," and a "dynamic online wallet token."

A "wallet token" may be hard coded onto a physical payment card, such as a payment provider branded card. The wallet token may be used in any format offline e.g. magnetic stripe reader, EMV or NFC. A "dynamic mobile wallet token" may be dynamically retrieved post login with the payment provider or similar authentication process for open loop (anywhere) one-time use mobile transactions. The validity of the dynamic mobile wallet tokens may be set in real time or at an account level via a backend policy applied on the BIN/IIN. The default validity of the dynamic mobile wallet token may expire after 15 minutes or any other predetermined expiration period. Once used, the dynamic mobile wallet token may not be re-used for a minimum period of one year or any other pre-designated period of time. Dynamic mobile wallet tokens may be used in any format offline e.g. BLE, Audio, NFC, Wi-Di, QR Code, BarCode, Checkin etc.

A "dynamic online wallet token" may be dynamically retrieved post login with the payment provider or other authentication methods like biometric authentication for open loop (anywhere) one-time use online transactions from the wallet token service, e.g., a payment provider wallet token service, and may be generated from a valid BIN/IIN range. The validity of the dynamic online wallet token may be set in real time or at an account level via a backend policy applied on the BIN. The default validity of the dynamic online wallet token is 15 minutes or any other predetermined expiration period. Once used, the dynamic online wallet token may not be re-used for a minimum period of one year or any other pre-designated period of time. Dynamic online wallet tokens may be passed by a merchant to processor/acquirer via any industry standard token certified gateway, e.g. PayPal Payflow.

A "payment token" may refer to a proxy value for a payment instrument/funding instrument (e.g., PAN) that is a 13 to 19-digit numeric value which passes basic validation rules of an account number, including the Luhn check digit. Payment tokens may be generated within a BIN/IIN range that has been designated as a token BIN/IIN range and flagged accordingly in all appropriate BIN/IIN tables. Payment tokens may not have the same value as or conflict with a real PAN. A payment token may be requested from an industry standard third party token service provider for a fee that may vary on usage and token assurance level.

At step 11, a user may pass the wallet tokens to a merchant or other entity to process a transaction. For example, the user may pass a wallet token to the merchant for a $100 sale via various types of transaction instruments, such as a payment card, a mobile device, a desktop device, a wearable device, and the like, via various channels, such as NFC, BLE, PayCode, check in, MSR, EMV, and the like. At step 12, the merchant may then pass the wallet token received at the point of sale (POS) to the acquirer along with transaction information, such as the product or service purchased, the amount of purchase ($100), location, time, date of purchase, and any other information related to the purchase.

At step 13, the acquirer then may process the information and pass the wallet token along with the transaction information to the appropriate payment network based on the Bank Identification Number (BIN) generated by the internal token vault. At step 14, the payment network may further process the wallet token by reviewing the BIN range used. The payment network may determine, based on the BIN range, that the wallet token was generated from the payment service provider, e.g., PayPal, and may send the wallet token back to the payment service provider for a $100 authorization.

At step 15, based on the funding instruments designated at the user's payment account, e.g., PayPal account, and the payment account balance of the user at the payment service provider, the payment service provider may send the appropriate authorization that needs to be sent to the issuer of the funding instrument along with payment token for the funding instrument. For example, the user may have $40 balance in the payment account at the payment service provider to be used for the $100 purchase. $60 is still needed to complete the purchase. As such, the payment service provider may send the authorization that needs to be sent to the issuer, e.g., authorization for $60.

At step 16, the payment network may receive the payment token from the payment service provider and may realize that this is a payment token from the payment service provider, e.g., PayPal, and may send the payment token back to payment service provider's token service provider for de-tokenization. At step 17, the payment service provider may process a payment token via VAP/MIP/GLO/PPG or via the relevant ISO8583 (and/or any other relevant data transmission protocol) connection (depending on what is adopted, the latter is a more standardized approach) based on the relevant payment network making the connection and may send the appropriate de-tokenized info relevant to the non-payment provider funding instrument (in this case $60 for credit card on file).

At step 18, the payment networks may receive the de-tokenized info for the non-payment provider funding instrument on file and may send it to the issuer via authentication transaction. At step 19, the issuer may review the PAN information and sends an authorization success call or message to the payment network. At step 20, the payment network may send the $60 authorization success back to the payment service provider, e.g., PayPal, via the established connection. At step 21, the payment service provider may process this information and may respond with a $100 authorization success call or message to the payment network.

At step 22, the payment network may send this $100 authorization success message back to the acquirer. At step 23, the acquirer may send the $100 authorization success message back to the merchant's POS allowing the retail associate to complete the transaction in the case of offline transaction or provide a success message to the user in the case of online transaction. At step 24, the payment service provider, e.g., PayPal, may send a notification (email/in-app) to the user that transaction has successfully been completed. The dynamic token may morph identity information of the user to any underlying metadata, such as payment, driver's license, loyalty program, Internet of Things (IoT), and the like.

Figure 3:
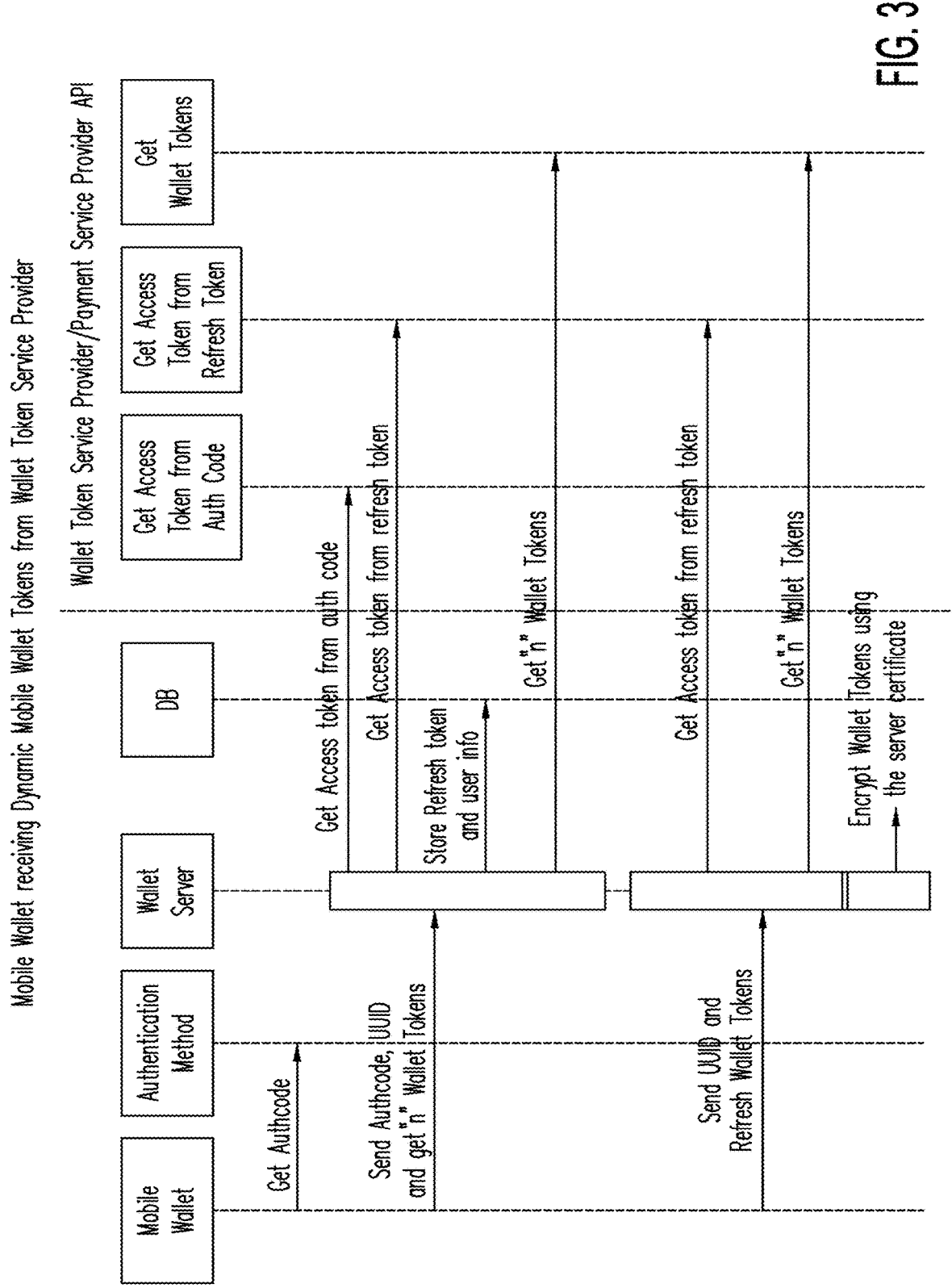
FIG. 3 is a sequence diagram showing a process for mobile wallet receiving dynamic mobile wallet tokens from wallet token service provider according to one embodiment.

FIG. 3 is a sequence diagram showing a process for mobile wallet receiving dynamic mobile wallet tokens from wallet token service provider according to one embodiment. In an embodiment, dynamic tokens are implemented via Host Card Emulation (HCE) over NFC.

Figure 4:
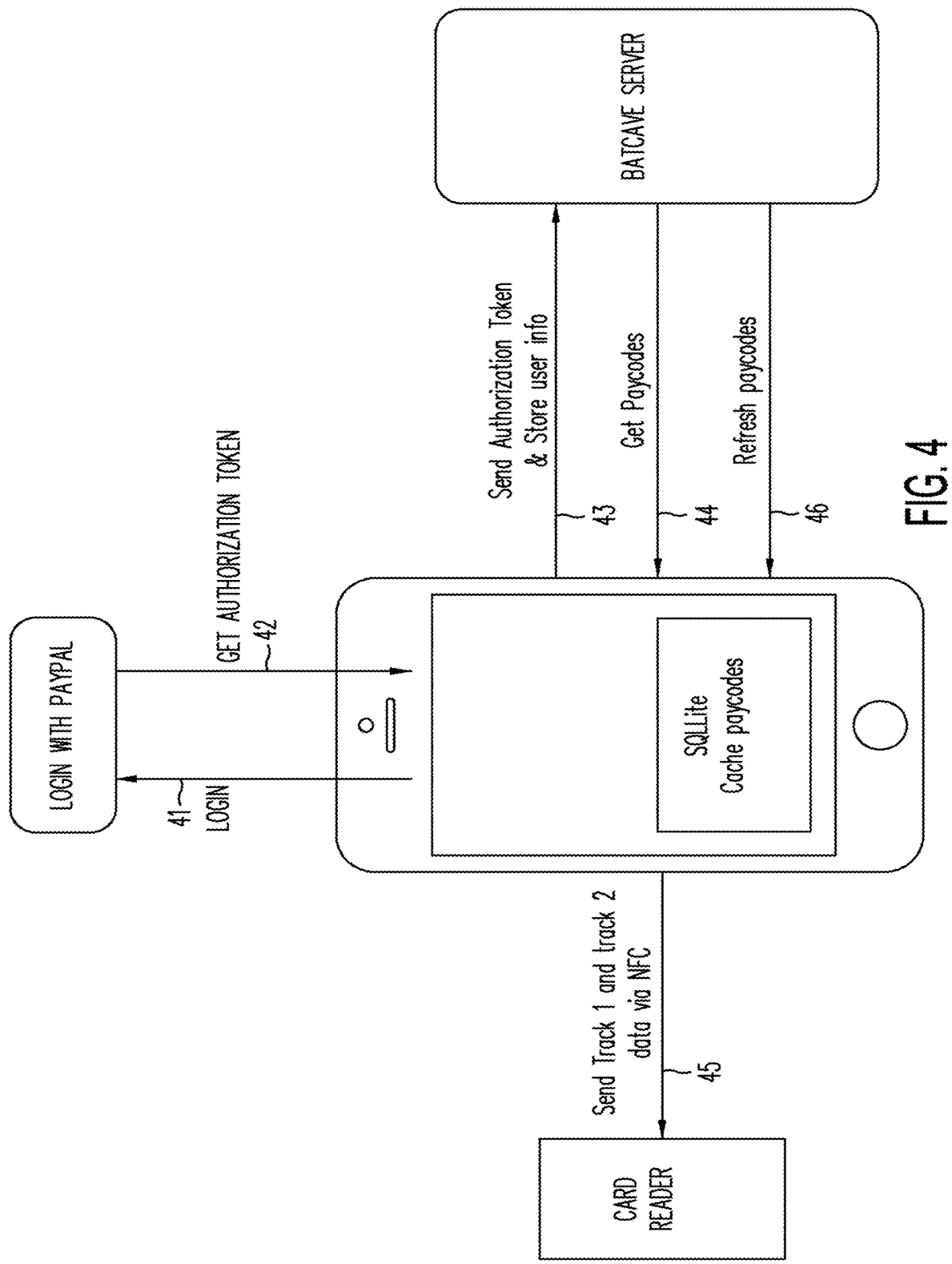
FIG. 4 illustrates processes performed at a user device for implementing hybrid dynamic wallet tokens according to one embodiment.

FIG. 4 illustrates processes performed at a user device for implementing hybrid dynamic wallet tokens according to one embodiment. At step 41, at the user device, such as a smart phone or any mobile device, a login process with a payment provider may be used to obtain the authorization token from the payment provider. At step 42, the authorization token may be received as a part of the URL, on successful login. At step 43, the authorization token and the device UUID may be sent to the server of the payment service provider. The server may get the access token and a refresh token based on the authorization code. The refresh token may not expire and may be stored in the server database. The above-obtained access token may not be valid and another access token may be obtained using the refresh token.

At step 44, pay codes may be obtained using the access token obtained in the last step. These pay codes may be cached on the user device. At step 45, when the user device is tapped onto or otherwise communicates with a reader, track 1 and track 2 data may be built which also has the pay code and sent across to the reader. At step 46, pay codes may be refreshed once the cached pay codes are either expired or used.

Figure 5:
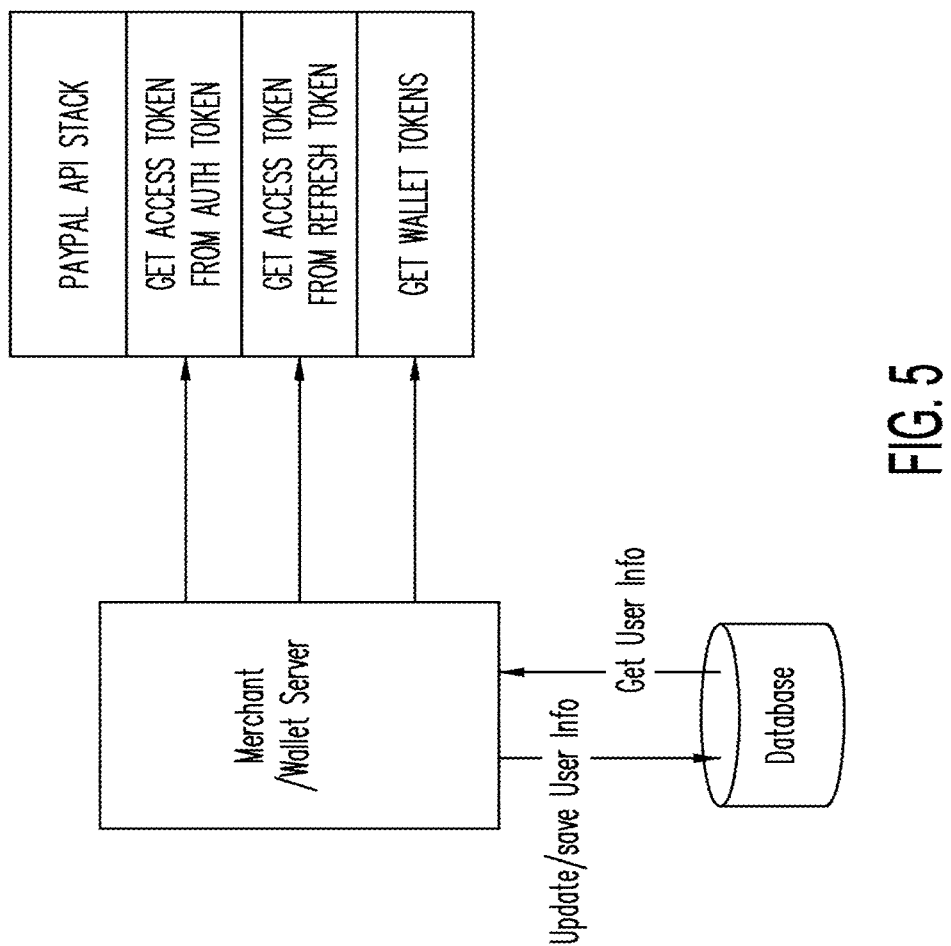
FIG. 5 illustrates processes performed at a merchant/wallet server for implementing hybrid dynamic wallet tokens according to one embodiment.

FIG. 5 illustrates processes performed at a merchant/wallet server for implementing hybrid dynamic wallet tokens according to one embodiment. In particular, FIG. 5 may represent the retrieval of dynamic mobile wallet tokens from payment provide servers, such as PayPal servers, securely to the wallet/merchant server, the secure storage of it on the wallet server, the secure transmission of it when necessary to the wallet application and the secure storage of it for use when network reliability is low or when there is no network connection to retrieve a token for usage during payments in store.

In FIG. 5, the "Update/Save User Info" step is a single or set of methods/functions/systems that pushes the latest access token, refresh token, authorization token or wallet token/s and also maintains the time of update and the tentative time of expiration. The "Get User Info" step is a single or set of methods/functions/systems that retrieve the authorization token, access token, refresh all or one of these to update the wallet token cache/wallet server module/methods/functions/systems that communicates with the payment provider, such as PayPal, or is part of the payment provider infrastructure and orchestrates the necessary functions for the wallet with the payment provider's core infrastructure to securely retrieve the relevant tokens needed to complete a payment transaction.

"Get Access Token from Auth Token" is a single or set of methods/functions/systems that resides within the wallet server/wallet application/payment application running out of payment provider specific trusted zone on payment ready hardware devices such as user device 110 that communicates securely with the payment providers server methods/functions/systems to authenticate itself using an authorization token and retrieve the access token that is needed to retrieve one time use or multiple use wallet tokens that represent the users identity and or the users wallet or payment tokens that represent the users identity and or funding instrument within the wallet or the users entire wallet along with the CID/CVV needed. The "Get Access Token from Refresh Token" is a single or set of methods/functions/systems that resides within the wallet token cache/wallet server/wallet application/payment application running out of payment provider specific trusted zone on payment ready hardware devices such as user device 110 that communicates securely with the payment providers server methods/functions/systems to retrieve the access token that is needed to retrieve one time use or multiple use wallet tokens that represent the user's identity and/or the user's wallet or payment tokens that represent the user's identity and or funding instrument within the wallet or the user's entire wallet along with the CID/CVV needed for current and future transactions.

The "Get Wallet Tokens" is a single or set of methods/functions/systems that resides within the wallet token cache/wallet server/wallet application/payment application running out of payment provider specific trusted zone on payment ready hardware devices such as user device 110 that communicates securely with the payment providers server methods/functions/systems to retrieve one time use or multiple use wallet tokens that represent the user's identity and or the user's wallet or payment tokens that represent the user's identity and or funding instrument within the wallet or the user's entire wallet along with the CID/CVV needed.

Figure 6:
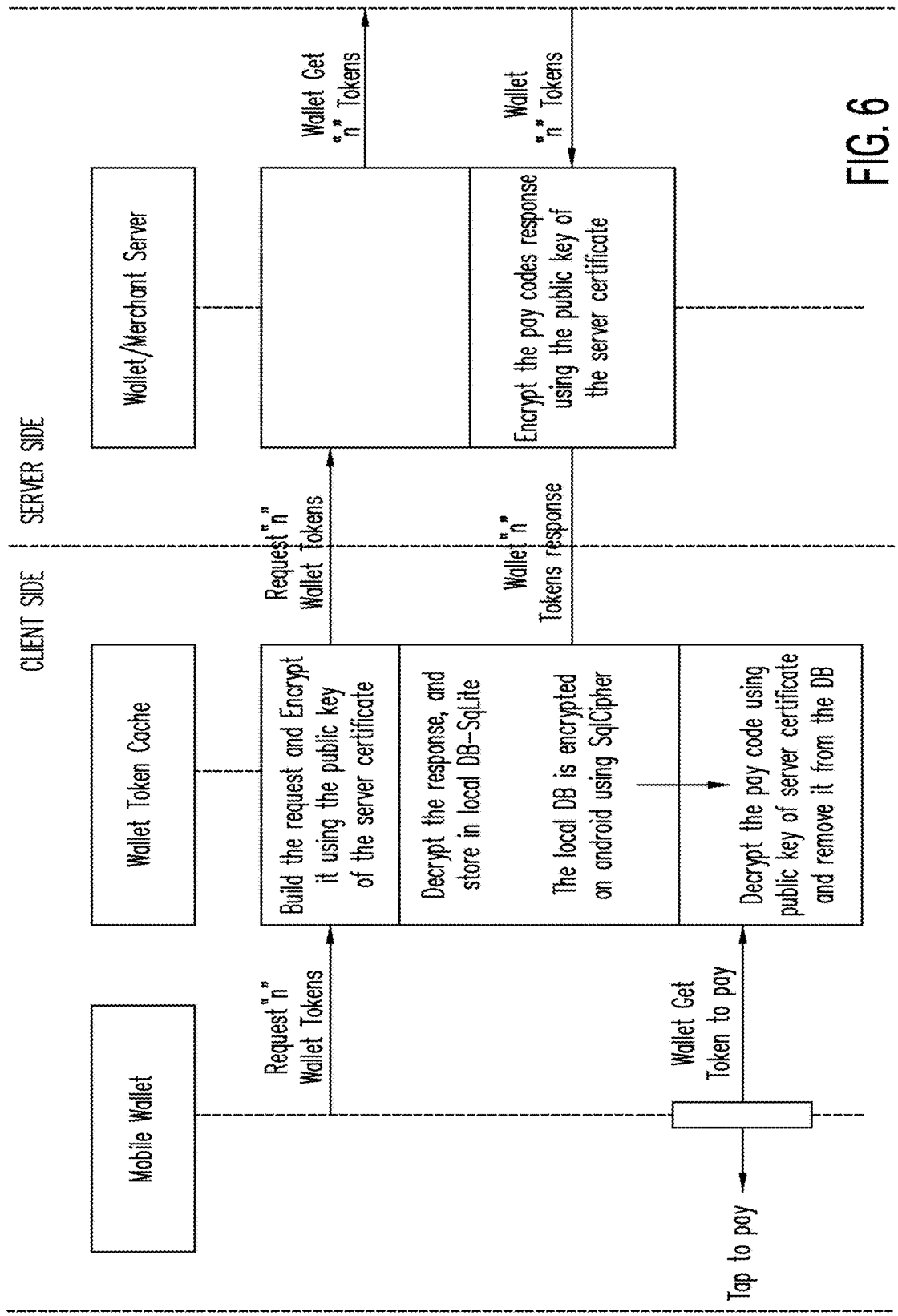
FIG. 6 is a sequence diagram showing a process for secure offline caching of dynamic mobile wallet token according to one embodiment.

FIG. 6 is a sequence diagram showing a process for secure offline caching of dynamic mobile wallet token according to one embodiment. The "wallet token cache" is an embodiment that resides either within the wallet application, a trusted zone within a telecommunications component within the user device or with a hardware embodiment within the user's device such as 110 described in FIG. 1. The "wallet token cache" communicates with its counterpart on the payment provider's infrastructure such as the "wallet server" or single/set of modules/methods/functions/systems that communicate with the payment provider's core on behalf of the wallet application abstracting functions/methods to secure and simplify the communication of secure data items between the wallet and the payment providers system/s/infrastructure. In one embodiment, the "wallet server" is the same as one described in FIG. 5. The mobile wallet is an application/group of methods/systems/functions that run on a user's device that the user uses to interact with the payment provider to retrieve payment related information/complete payment transactions/get details about the transactions/push or pull funds from various funding sources/request for credit and additional funds when required. The mobile wallet has a wallet cache or interacts with a trusted zone in the user device that acts as a cache or interacts with external payment provider or merchant devices that can securely communicate with the payment provider to retrieve/store/deliver wallet or payment tokens for payment transactions.

Figure 7:
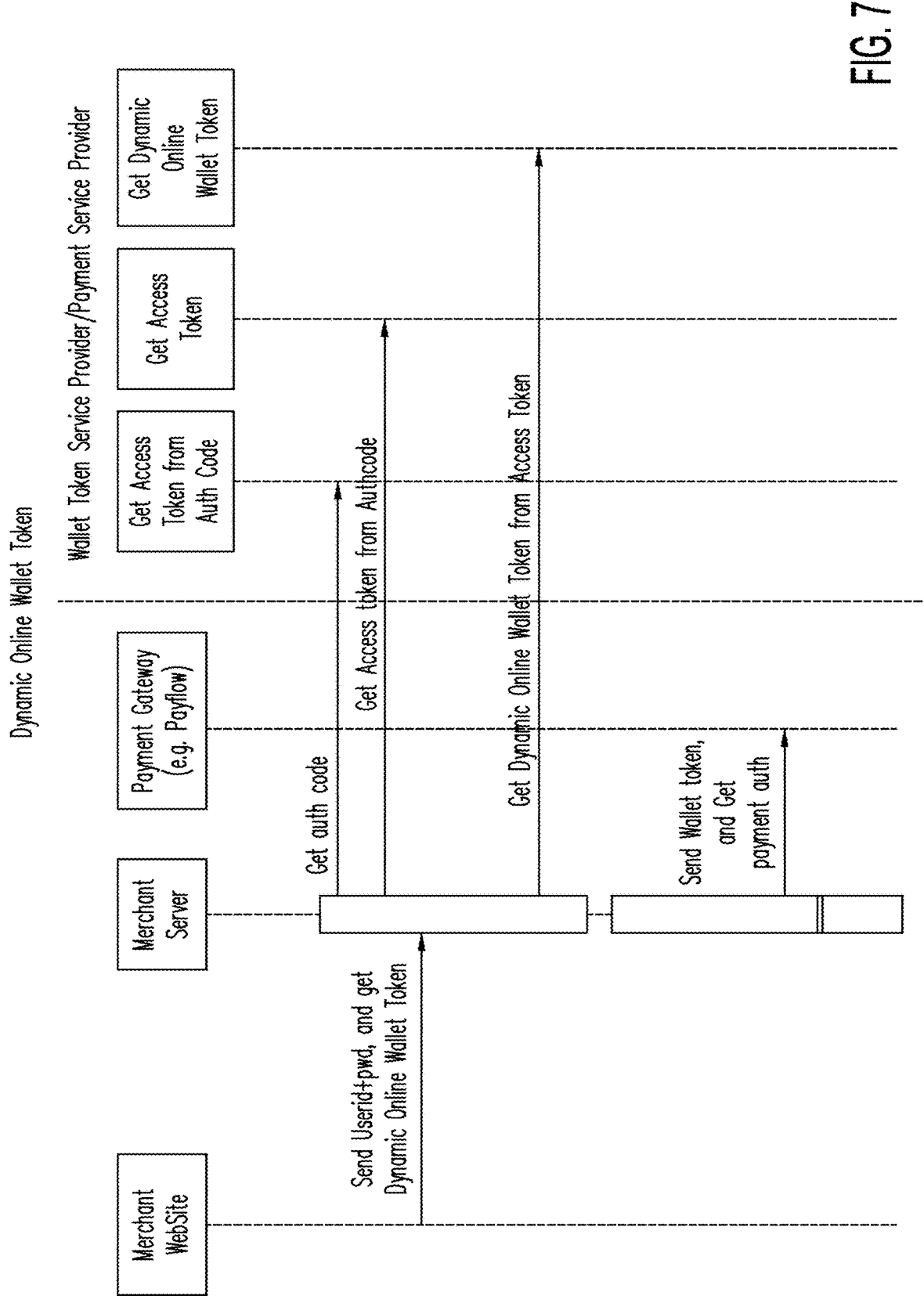
FIG. 7 is a sequence diagram showing a process for implementing dynamic online wallet token according to one embodiment.

FIG. 7 is a sequence diagram showing a process for implementing dynamic online wallet token according to one embodiment. In particular, FIG. 7 may represent the retrieval of dynamic online wallet tokens from payment provider servers 170, such as PayPal servers, securely for one time use on websites accessed via a desktop/mobile browser.

Figure 9:
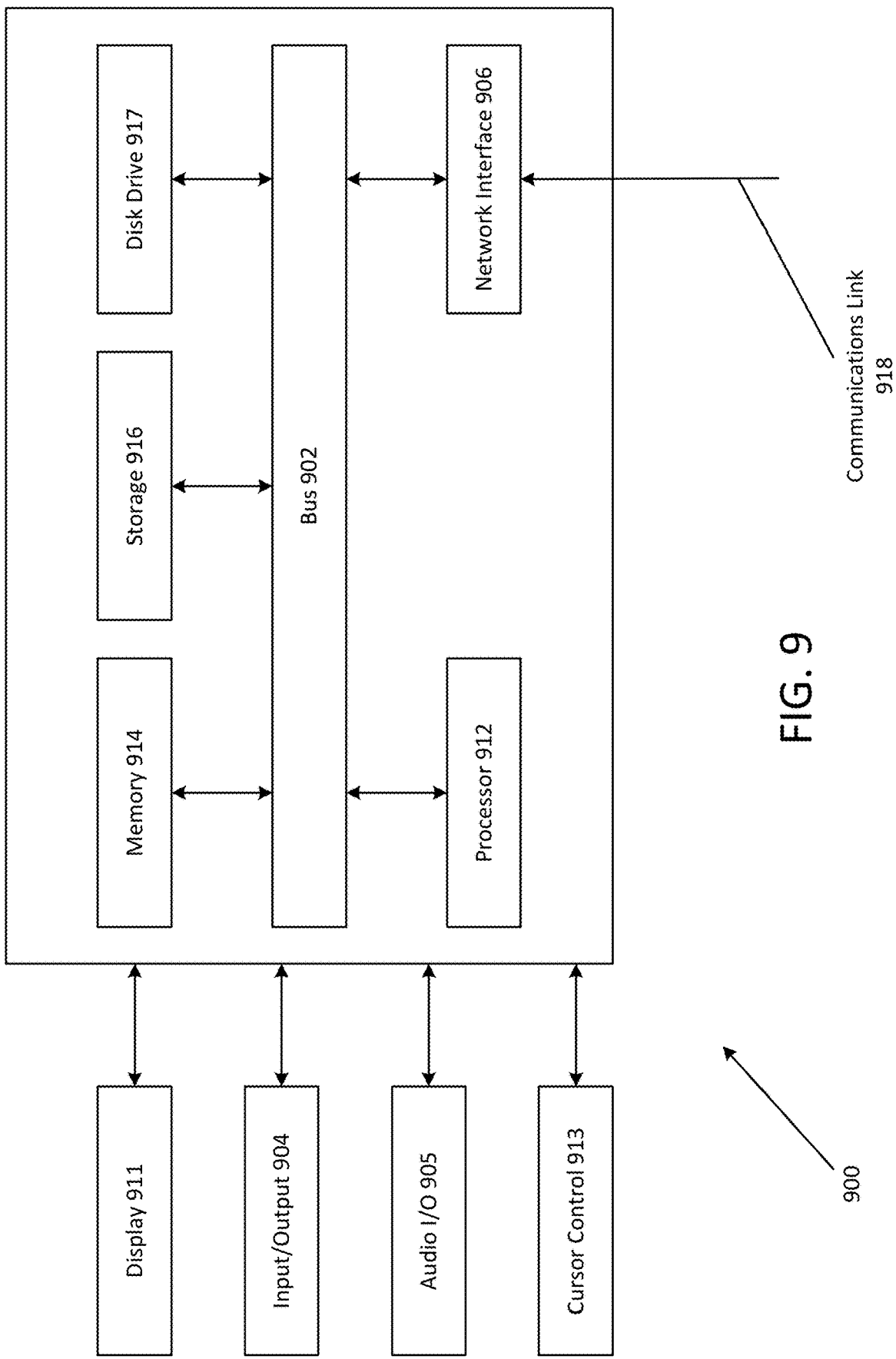
FIG. 9 is a block diagram of a computer system suitable for implementing one or more components in FIG. 1 according to one embodiment.

FIG. 9 is a block diagram of a computer system 900 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons or links, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as another user device, a merchant server, or a payment provider server via network 360. In one embodiment, the transmission is wireless, although other transmission mediums and methods may also be suitable. A processor 912, which can be a micro-controller, digital signal processor (DSP), or other processing component, processes these various signals, such as for display on computer system 900 or transmission to other devices via a communication link 918. Processor 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor 912 and other components by executing one or more sequences of instructions contained in system memory component 914. Logic may be encoded in a computer readable medium, which may refer to any medium that participates in providing instructions to processor 912 for execution. Such a medium may take many forms, including but not limited to, non-volatile media, volatile media, and transmission media. In various implementations, non-volatile media includes optical or magnetic disks, volatile media includes dynamic memory, such as system memory component 914, and transmission media includes coaxial cables, copper wire, and fiber optics, including wires that comprise bus 902.

In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system of a service provider, the system comprising:
a non-transitory memory storing instructions; and
one or more hardware processors associated with the service provider, wherein the one or more hardware processors are coupled with the non-transitory memory and configured to execute the instructions to cause the system to perform operations comprising:
receiving, from a user device associated with a user, a user request for performing an electronic payment transaction with a merchant;
determining a product or a service being purchased in association with the electronic payment transaction based on the user request;
determining, from a plurality of non-payment information corresponding to different data types and associated with the user, particular non- payment information for inclusion in a wallet token based on the product or the service being purchased in association with the electronic payment transaction;
generating the wallet token having a plurality of data fields in a payment card format readable by a point-of-sale (POS) device of the merchant by (i) embedding, in a first data field of the plurality of data fields that corresponds to a primary account number (PAN) data field of the payment card format, a first code that directs a payment network to send the wallet token back to the service provider and (ii) embedding a second code representing the particular non-payment information in a second data field of the plurality of data fields that corresponds to a discretionary data field of the payment card format;
providing the wallet token to the user device;
receiving the wallet token from an acquirer host via the payment network;
in response to receiving the wallet token from the acquirer host via the payment network, identifying, from a plurality of payment accounts, a first payment account associated with the user based at least in part on the first code embedded in the wallet token and retrieving the particular non-payment information associated with the user based on the second code embedded in the wallet token; and
processing the electronic payment transaction by (i) transmitting the particular non-payment information represented by the second code in the wallet token to a merchant server associated with the merchant without transmitting funding information to the merchant server and (ii) transmitting an account number of the first payment account to an issuer host via the payment network.

2. The system of claim 1, wherein the electronic payment transaction is processed based on the particular non-payment information.

3. The system of claim 1, wherein the operations further comprise:
authenticating the user based on user credentials received from the user device; and
in response to authenticating the user, transmitting an authorization token to the user device, wherein the wallet token is generated further based on the authorization token.

4. The system of claim 3, wherein the operations further comprise:
generating a refresh token based on the authorization token, the refresh token configured to update the authorization token.

5. The system of claim 1, wherein the particular non-payment information comprises healthcare information, and wherein the particular non-payment information is determined for inclusion in the wallet token when the product or the service is medical related.

6. The system of claim 1, wherein the particular non-payment information comprises an age of the user, and wherein the particular non-payment information is determined for inclusion in the wallet token when the product or the service is restricted to a particular age group.

7. The system of claim 1, wherein the operations further comprise morphing the particular non-payment information to meta data.

8. The system of claim 1, wherein the operations further comprise:
   determining a user preference related to the electronic payment transaction; and
   generating the particular non-payment information based on the user preference.

9. The system of claim 8, wherein the user preferences comprise a tip amount.

10. A method comprising:
    receiving, by one or more hardware processors associated with a service provider from a user device associated with a user, a user request for performing an electronic payment transaction with a merchant, wherein the electronic payment transaction is associated with a payment amount;
    determining a product or a service being purchased in association with the electronic payment transaction based on the user request;
    determining, by the one or more hardware processors from a plurality of non-payment information corresponding to different data types and associated with the user, particular non-payment information for inclusion in a wallet token based on the product or the service being purchased in association with the electronic payment transaction;
    generating, by the one or more hardware processors, the wallet token having a plurality of data fields in a payment card format readable by a point-of-sale (POS) device of the merchant by (i) embedding, in a first data field of the plurality of data fields that corresponds to a primary account number (PAN) data field of the payment card format, a first code that directs a payment network to send the wallet token back to the service provider and (ii) embedding a second code representing the particular non-payment information in a second data field of the plurality of data fields that corresponds to a discretionary data field of the payment card format;
    providing by the one or more hardware processors, the wallet token to the user device;
    in response to receiving the wallet token from an acquirer host via the payment network, identifying, by the one or more hardware processors from a plurality of payment accounts, a first payment account associated with the user based at least in part on the first code embedded in the wallet token and retrieving the particular non-payment information of the user based on the second code embedded in the wallet token;
    determining, by the one or more hardware processors, that a first funding source associated with the first payment account has insufficient funds for paying for the electronic payment transaction; and
    processing, by the one or more hardware processors, the electronic payment transaction by (i) transmitting the retrieved particular non-payment information represented by the second code in the wallet token to a merchant server associated with the merchant, (ii) transmitting a first account number of the first funding source to a first issuer host via the payment network to process a first portion of the payment amount, and (iii) transmitting a second account number of a second funding source associated with the first payment account to a second issuer host via the payment network to process a second portion of the payment amount.

11. The method of claim 10, wherein the electronic payment transaction is processed based on the particular non-payment information.

12. The method of claim 10, wherein the particular non-payment information comprises a tipping preference, and wherein the particular non-payment information is determined for inclusion in the wallet token when the product or the service is a type that accepts tips.

13. The method of claim 10, further comprising:
    determining a user preference related to the electronic payment transaction; and
    generating the particular non-payment information based on the user preference.

14. A non-transitory machine-readable medium having stored thereon machine-readable instructions executable to cause a machine associated with a service provider to perform operations comprising:
    receiving, from a user device associated with a user, a user request for performing an electronic payment transaction with a merchant;
    determining a product or a service being purchased in association with the electronic payment transaction based on the user request;
    determining, from a plurality of non-payment information corresponding to different data types and associated with the user, particular non-payment information for inclusion in a wallet token based on the product or the service being purchase in association with the electronic payment transaction;
    generating the wallet token having a plurality of data fields in a payment card format corresponding to a payment transaction request and readable by a point-of-sale (POS) device of the merchant by (i) embedding, in a first data field of the plurality of data fields that corresponds to a primary account number (PAN) data field of the payment card format, a first code that directs a payment network to send the wallet token back to the machine and (ii) embedding a second code representing the particular non-payment information in a second data field of the plurality of data fields that corresponds to a discretionary data field of the payment card format;
    providing the wallet token to the user device;
    in response to receiving the wallet token from an acquirer host via the payment network, identifying, from a plurality of payment accounts, a first payment account associated with the user based at least in part on the first code embedded in the wallet token;
    retrieving the particular non-payment information of the user based on the second code embedded in the wallet token; and
    processing the electronic payment transaction by (i) transmitting the retrieved particular non-payment information represented by the second code in the wallet token to a merchant server associated with the merchant and (ii) transmitting an account number of the first payment account to an issuer host via the payment network.

15. The non-transitory machine-readable medium of claim 14, wherein the electronic payment transaction is processed based on the particular non-payment information.

16. The non-transitory machine-readable medium of claim 14, wherein the particular non-payment information comprises insurance information, and wherein the particular non-payment information is determined for inclusion in the wallet token when the product or the service is associated with an insurance policy.

17. The non-transitory machine-readable medium of claim 14, wherein the operations further comprise:
   determining a user preference related to the electronic payment transaction; and
   generating the particular non-payment information based on the user preference.

\* \* \* \* \*